United States Patent [19]

Lochmahr et al.

[11] Patent Number: 5,747,759
[45] Date of Patent: May 5, 1998

[54] CONTROL UNIT FOR VEHICLE CLIMATE CONTROL

[75] Inventors: Karl Lochmahr, Vaihingen; Werner Rauland, Pforzheim, both of Germany

[73] Assignee: Behr GmbH & Co., Stuttgart, Germany

[21] Appl. No.: 736,693

[22] Filed: Oct. 25, 1996

[30] Foreign Application Priority Data

Oct. 31, 1995 [DE] Germany ............... 195 40 553.6

[51] Int. Cl.⁶ .................... H01H 9/18; G08B 6/00
[52] U.S. Cl. ............ 200/5 R; 200/5 A; 200/308; 116/205; 116/DIG. 17; 340/407.1
[58] Field of Search ................ 307/10 R; 200/6 A, 200/61.54, 5 R, 6 R, 6 C, 50 C, 308; 340/407.1; 434/112, 113; 116/205, DIG. 17; D12/192

[56] References Cited

U.S. PATENT DOCUMENTS

| | | | |
|---|---|---|---|
| 4,131,772 | 12/1978 | Weckenmann et al. | 200/61.54 |
| 4,180,713 | 12/1979 | Gonzales | 200/52 R |
| 4,191,242 | 3/1980 | Kumagai | 165/11 |
| 4,665,291 | 5/1987 | Ishikawa | 200/308 |
| 4,701,629 | 10/1987 | Citroen | 200/52 R |
| 4,742,198 | 5/1988 | Martin et al. | 200/308 |
| 5,245,142 | 9/1993 | Sacco et al. | 200/5 R |
| 5,551,877 | 9/1996 | Murphy | 434/112 |
| 5,594,422 | 1/1997 | Huey, Jr. et al. | 340/628 |

FOREIGN PATENT DOCUMENTS

| | | |
|---|---|---|
| 44 693 | 12/1986 | European Pat. Off. . |
| 31 07 722 | 9/1982 | Germany . |
| 31 41 875 | 5/1983 | Germany . |
| 39 24 292 | 12/1990 | Germany . |
| 40 17 895 | 11/1991 | Germany . |
| 41 37 888 | 5/1993 | Germany . |
| 42 19 942 | 6/1993 | Germany . |
| 93 08 135.9 | 10/1993 | Germany . |
| 43 33 171 | 4/1995 | Germany . |
| 44 23 744 | 4/1995 | Germany . |
| 44 25 577 | 6/1995 | Germany . |
| 195 07 952 | 9/1995 | Germany . |
| 195 14 976 | 11/1995 | Germany . |
| 90 17 947.1 | 5/1993 | WIPO . |

OTHER PUBLICATIONS

Grohmann et al., "The Automatic Head and Air Conditioner from the New 7' Series BMW", AZT Automobiltechnische Zeitschrift 90, (1988) 3.

Primary Examiner—Stuart N. Hecker
Assistant Examiner—Derek J. Jardieu
Attorney, Agent, or Firm—Foley & Lardner

[57] ABSTRACT

A control unit for controlling devices or assemblies comprises a plurality of control elements located on a control surface. These control elements are provided with correspondingly assigned symbols for visually displaying the function of the respective control element and can be adjusted into at least two positions. In order to make reliable control easier, even under unfavorable light conditions, the control elements or an area directly adjoining them are provided with means for distinguishing the respective control element haptically. The control unit is suitable in particular for controlling a heating and/or air conditioning system in a motor vehicle.

20 Claims, 2 Drawing Sheets

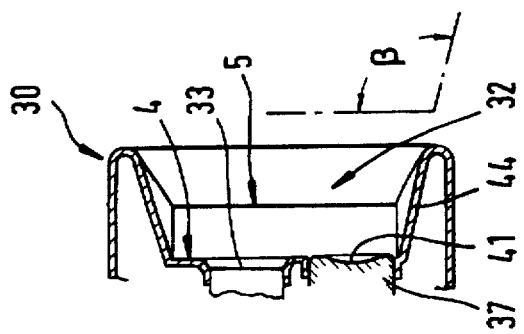
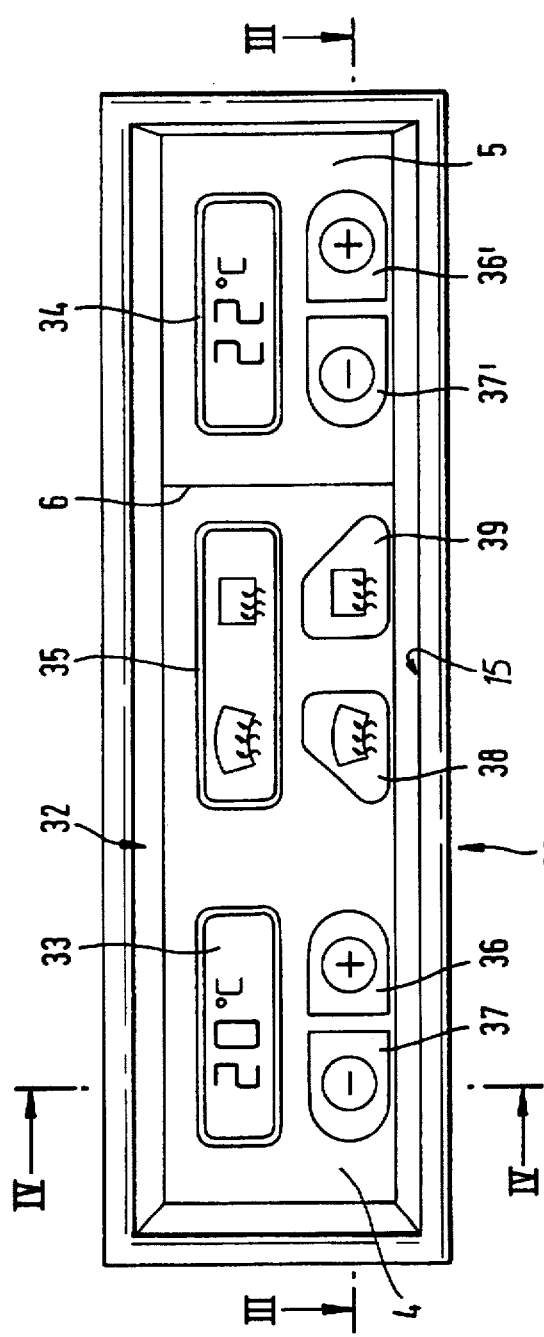
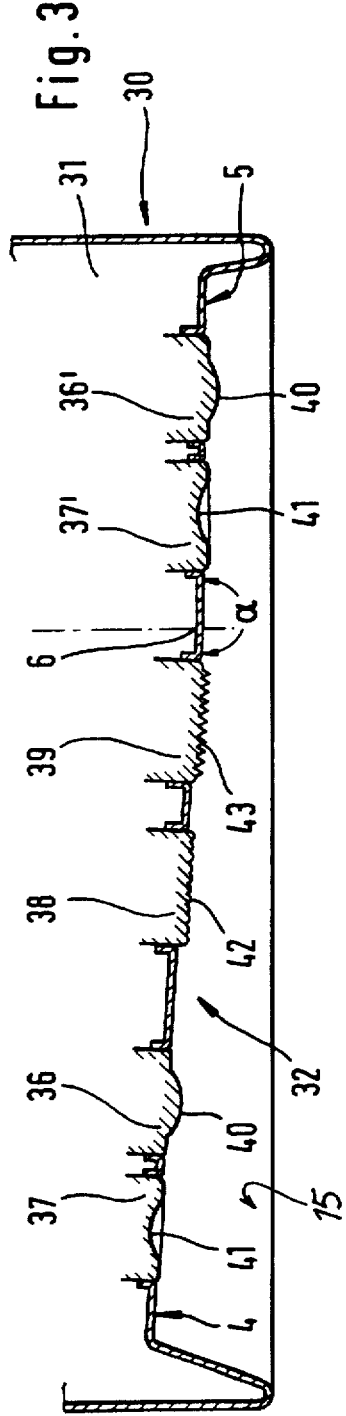

CONTROL UNIT FOR VEHICLE CLIMATE CONTROL

BACKGROUND OF THE INVENTION

The present invention relates to a control unit for controlling devices and/or assemblies in a motor vehicle, in particular a heating system and/or air conditioning system.

DE 31 07 722 A1 describes a control unit for a heating system and air conditioning system in a motor vehicle, which control unit comprises a temperature selection switch and a plurality of push-button keys for selecting one of a plurality of stored program. The various push-button keys are assigned characteristic symbols to identify them, and by means of these symbols a visual determination of the respective key is possible. Under unfavorable light conditions, for example, in strong sunlight or when there is reflection from the surface, such symbols are difficult to discern so that incorrect operation may occur. Having to search for the respective push-button key can also distract the driver to such a degree that driving safety may be adversely affected.

In the paper by Grohmann, Kess, Egle "Klimaautomatik der neuen 7er Baureihe von BMW [Automatic air conditioning system of the new 7 series from BMW]", ATZ Automobiletechnische Zeitschrift 90 (1988), Issue 3, an activation device for an air conditioning system is described, wherein the activation elements are identified by means of symbols comprising easily understood graphics. The activation elements comprise both adjustment wheels and short-stroke keys, the latter engaging after a specific locking stroke so that by touch it is possible to determine whether the respective key is in the pressed or non-pressed function position. When the headlights are switched on, the activation elements are lit up with the aid of LEDs. In the known array, in addition to visually locating the activation elements, it is possible to feel the respective switched state of the push-button keys, but in poor light conditions it is not possible for the driver to determine which key it is. Thus, it is possible to confuse the respective keys if they are looked at only fleetingly, with the result that the driver is distracted from what is happening on the road in order to make an unambiguous visual appraisal of the activation elements.

SUMMARY OF THE INVENTION

It is one object of the present invention to provide an improved control unit for controlling devices and/or assemblies in a motor vehicle.

A particular object of the invention is to provide such a control unit with which it is possible for the driver to find and recognize the control elements without his attention being distracted from the road traffic.

In accomplishing the foregoing objects, there has been provided in accordance with the present invention a control unit suitable for controlling a motor vehicle heating and/or air conditioning system, comprising: a plurality of control elements located on a control surface and having symbols, assigned to the respective control elements, for visually displaying the operation of the respective control element; and an orientation strip arranged on the control surface and comprising identification zones assigned to the respective control elements and having respective haptically coded surfaces.

The essential advantages of the invention are that the means for distinguishing the control elements haptically permit so-called blind operation, i.e., enable the respective control element to be recognized with certainty even without visual support. As a result, incorrect operation is avoided and driving safety is increased.

Further objects, features and advantages of the invention will become apparent from the detailed description of prepared embodiments which follows when considered together with the accompanying figures of drawing.

BRIEF DESCRIPTION OF THE DRAWINGS

Exemplary embodiments of the invention are explained in greater detail below with reference to the drawings, in which:

FIG. 2 is a front view of a control unit with keys and displays according to another embodiment of the invention;

FIG. 3 is a sectional view taken along the line III—III in FIG. 2;

FIG. 4 is a sectional view taken along the line IV—IV in FIG. 2; and

DETAILED DESCRIPTION OF THE PREFERRED EMBODIMENTS

Figure 1:
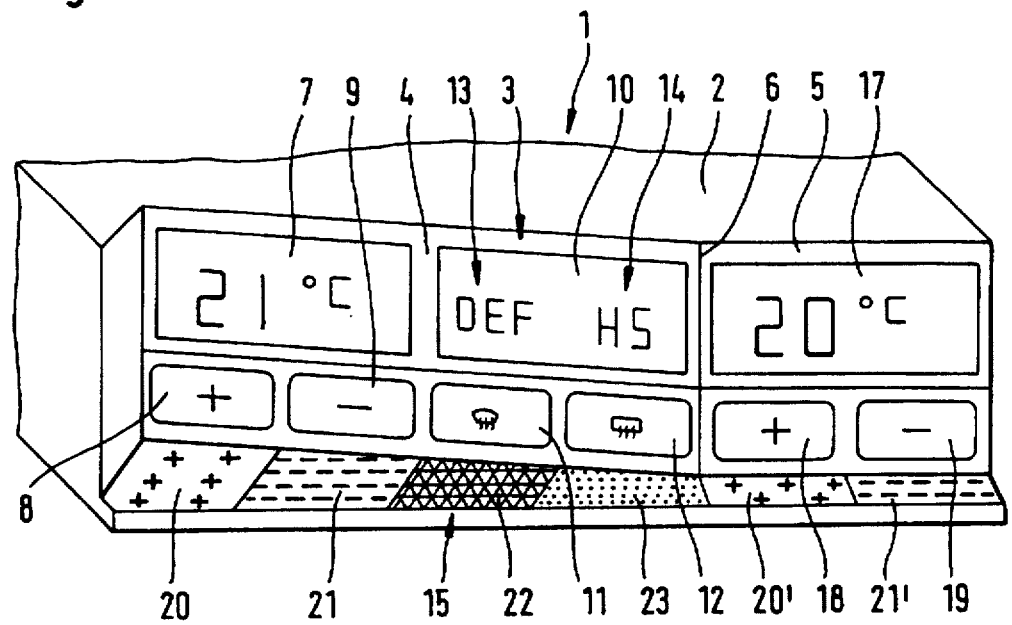
FIG. 1 is a perspective view showing a control unit with a plurality of keys, displays and an orientation strip underneath the keys.

According to the most preferred aspect of the invention, an orientation strip with identification zones which are assigned to the control elements and have haptically coded surfaces is arranged on the control surface. Such an orientation strip may be provided instead of, or in addition to, haptically coded control elements. Such an orientation strip makes it possible to determine, even before the control element is actually touched, toward which control element the finger is moving. Since the push-button keys or rotary knobs themselves do not need to have haptic coding when such an orientation strip is present, identical keys may optionally be used at different points of the control unit so that the diversity of parts is somewhat reduced.

It is particularly expedient that the orientation strip extends underneath the respective control elements, preferably along the lower edge of the control surface. This edge area of the control unit is accessed extremely easily by the fingertips and is in an ergonomically convenient position. The fingertips contain a particularly large density of touch receptors so that this area is particularly sensitive. In order to distinguish individual identification zones or groups of identification zones more easily, it is proposed to provide delimitation structures or means between the identification zones or groups of identification zones. These delimitation structures or means are preferably formed by webs which are slightly elevated and run essentially transversely with respect to the longitudinal direction of the orientation strip. The webs which are only slightly elevated above the surface of the identification zones do not impede the feeling of the identification zones in any way and, on the other hand, the delimitation which can be felt clearly makes assignment easier. It is also possible to arrange the push-button keys in the identification zones, as a result of which space is saved and the controllability made easier.

In order to code the surfaces on the control elements or identification zones, a characteristic structure, for example, by means of roughness, a pattern or direction of a pattern, may preferably be provided. A further measure for coding the surfaces is to generate on the surfaces of neighboring push-button keys or identification zones a temperature which feels significantly different to the skin. This can be effected for example with the aid of a Peltier element.

According to a first embodiment of the invention, the control elements have a haptically coded surface. As a result, the control element itself is identified individually. Expediently, at least some of the control elements of a control unit are constructed as push-button keys with characteristic front surfaces. Such front surface structures can be realized without appreciable additional outlay when the push-button keys are manufactured. For different reasons, for example, design or ergonomy, it may be necessary to construct one or more control elements as a rotary knob. So that the rotary knob can also be distinguished haptically in terms of the various functions to be set, the rotary knob is constructed with at least a partially coded part of its surface.

So that the set operating function of a control element can also be made apparent in a visual way, it is advantageous to assign to one or more control elements a display, in which the function which has been set is displayed. For the functions which can be adjusted infinitely or in a plurality of stages, it is considered expedient to assign two neighboring push-button keys with adjustment in opposite directions to the same function, i.e., one key is used to increase the value of the respective function, and the other key to reduce the value. In order to code in a suitable way these push-button keys located one next to the other, it is considered advantageous that the front surface of one push-button key is provided with a concave depression and the front surface of the other push-button key is provided with a convex bulge. Push-button keys which are designed in this way are particularly suitable as desired-value actuators for adjusting the temperature, and a display which serves as a digital temperature display is assigned to these push-button keys.

In vehicles with higher demands on the heating and air conditioning comfort, the air which flows into the passenger compartment should be capable of being adjusted individually to suit the respective driver and front seat passenger. For this purpose it is expedient to provide two arrays of push-button keys and a temperature display for adjusting the temperature in the control unit, one array serving to adjust the heating or air conditioning requirement for the driver's side and the other array serving to adjust it for the front seat passenger's side. In order to provide a clear differentiation between the push-button keys assigned to the front seat passenger's side and the push-button keys assigned to the driver's side, it is advantageous for the control surface to be divided into two control areas, each control area forming essentially a plane and the two planes being arranged at an angle with respect to one another. By means of such a division of the control surface into control areas, it is also possible to make a division according to other criteria, for example, into an area with control elements which serve to promote traffic safety (defrosting of the windshield, heating of the rear window) and control elements for personal comfort (temperature of the passenger compartment, blower power, air distribution). By means of such an arrangement of planes which enclose an angle, it is expedient to arrange the control area with the control elements which are particularly relevant to the driver in such a way that the surface of the control panel runs as far as possible perpendicularly with respect to the driver's line of sight. To this end, the contact line between the two planes should run essentially vertically and the angle between the front sides of the planes should be approximately 185° to 200°.

In the case of a control surface which runs obliquely with respect to the plane of the dashboard, it is advantageous for the orientation strip to form—in plan view—at least in an essential section of its longitudinal extent, a wedge-shaped surface which is deeper on one side than on the other side. As a result, identification zones of different sizes are produced so that simply the size of the identification zones serves as an additional feature for making a haptic distinction. For ergonomic reasons, it is expedient to arrange the orientation strip at an angle with respect to the control surface, with an angle of approximately 100° to 140° between the control surface and the orientation strip being considered particularly expedient. In order to inform the driver of the setting which he has made, a device for audible acknowledgment of a setting of one of the control elements can also be advantageously provided.

Referring now to the drawings, FIG. 1 shows a control unit 1 which has a control surface 3 on one housing 2. The face of the control surface 3 which serves for visual purposes should be arranged perpendicularly with respect to the driver's line of sight. The control surface is divided into two control areas 4 and 5, the control area 4 being assigned to the driver and the control area 5 being assigned to the front seat passenger. The control areas 4 and 5 are arranged in planes which run at an angle with respect to one another, with the plane of the control area 5 running parallel to the plane of the dashboard. The control area 4 faces the driver as a result of its arrangement at an angle with respect to the control area 5, so that the driver's view is directed as far as possible perpendicularly onto the control area 4 of the control surface 3.

The control area 4 comprises a display 7 for displaying a temperature. This display 7 is assigned to two push-button keys 8 and 9 which serve as desired-value actuators for the desired passenger compartment temperature on the driver's side. In this context, the push-button key 8 is provided for increasing the desired value and the push-button key 9 for reducing the desired value. Furthermore, in the control area 4 of the control surface 3 there is a display 10 which extends above a push-button key for defrosting the windshield and a push-button key 12 for heating the rear window. The display 10 comprises a display 13 with the letters DEF and a display 14 with the letters HS which each appear only in the switched-on state of the respective push-button key 11 or 12.

A display 17 for displaying a desired value of the temperature of the passenger compartment of the vehicle on the front seat passenger's side and push-button keys 18 and 19 are arranged in the control area 5 of the control surface 3. These push-button keys correspond to the push-button keys 8 and 9 and fulfill the same function: however, they are for adjusting the desired value of the temperature for the front seat passenger's side. An orientation strip 15 extends along the lower edge of the control surface 3 on the housing 2, and comprises a plurality of identification zones 20, 21, 22, 23 and 20', 21' each assigned to one push-button key. These identification zones each have a surface with a characteristic structure so that when a finger of the operator touches an identification zone it is possible to determine which of the push-button keys 8, 9, 11, 12 and 18, 19 the finger is located in front of, i.e., on the basis of the quality of the surface of the respective identification zone. In this way, the respective push-button keys can be distinguished haptically so that precise assignment is possible with certainty even without visual support.

In the exemplary embodiment in FIG. 1, crosses which stand out in a relief-like manner on the surface of the identification zone 20 are provided as plus symbols, corresponding to the function of the associated push-button key. The surface of the identification zone 21 is provided with short, transversely running bars which are raised in a relief-like manner and characterize a minus sign. Owing to the substantially larger number of relief-like elevations in the identification zones 21 in comparison with those in the identification zone 20, it is possible to make a haptic distinction even if the shape of the relief-like crosses (plus signs) cannot be perceived unambiguously. The identification zone 22 has ribbing with pointed elevations arranged in rows. On the surface of the identification zone 23 there is a plurality of dot-shaped knobs; however, a roughened surface could also be provided instead.

Owing to the structures of the identification zones 20 to 23 which differ from one another significantly, it is possible to locate with certainty the respective identification zone by means of the sensitivity of the skin, e.g. tickling, vibration, sensation of heat and of cold, on the basis of its coded surface. The push-button keys 18 and 19 are assigned identification zones 20', 21' on the orientation strip 15, the surface structure corresponding in each case to the identification zones 20, 21. Since the orientation strip 15 forms in the plan view, at least over an essential section of its longitudinal extent, a wedge-shaped surface which is deeper on one side than on the other side, the identification zones 20 and 21 are significantly larger than the identification zones 20', 21', so that a difference between the zones 20 and 20' can also be felt.

Of course, the control surface 3 may also comprise further push-button keys and, if appropriate, also switches for additional functions, for example, for fresh air or circulating air mode.

FIG. 2 shows the front view of a control unit 30 which comprises a housing 31 and a plurality of displays 33, 34, 35 arranged on a control surface 32, and push-button keys 36, 37, 38, 39 and 36', 37'. The control surface 32 comprises in turn the control areas 4 and 5 similar to those already described with respect to FIG. 1. Underneath the control areas 4 and 5 extends an orientation strip 15 of the same general type as detailed in conjunction with FIG. 1. (Therefore, the orientation strip is not shown in detail in FIG. 2.) The displays 33, 34, 35 are of different design from the embodiment previously described, as are the push-button keys 36 to 39, but they serve the same purpose in accordance with their arrangement.

In contrast with the embodiment already described, in the exemplary embodiment of FIG. 2 the push-button keys 37 to 39 are provided on their front surfaces with a characteristic structure so that when the push-button keys 37 to 39 are touched it is possible to make a distinction haptically. These haptically coded surfaces are shown in the illustration in FIG. 3 in which there is a section along the line III—III in FIG. 2. This illustration also shows that the control areas 4 and 5 of the control surface 3 are arranged at an angle α with respect to one another, a contact line 6 being formed at the point of intersection of the two planes. The angle α is 185° in the exemplary embodiment but an angle α of up to about 200° may equally well be provided.

The front surfaces of the push-button keys 36 to 39 are provided with haptic coding so that the push-button keys themselves can be distinguished haptically, in other words, independently of the orientation strip. The push-button key 36 for increasing the desired value for the passenger compartment temperature on the driver's side has a convex bulge 40, and the push-button key 36', which has the same function for the passenger compartment temperature of the front seat passenger's side, has the same shape. The push-button key 37 serves to reduce the desired value for the passenger compartment temperature and has a convex depression 41 on its front surface; the push-button key 37' in the control area 5 has the same shape.

The push-button key 38 for defrosting the windshield is provided on its front surface with a burled structure 42. A burled pattern with pointed knobs is provided on the front surface of the push-button key 39 for heating the rear window. Thus, all the push-button keys 37 to 39 which are assigned to the control area 4 differ as a result of the structure of their front surface, which structure can be located with certainty without visual aid. The fact that the push-button keys 36', 37' have the same characteristic front surface as the push-button keys 36 and 37 in the control area 4 does not lead to them being confused since the push-button keys with identical front surfaces are assigned to different control areas 4 and 5.

FIG. 4 shows a section along the line IV—IV of FIG. 2. In the housing 31 of the control unit 30 there is, set back somewhat with respect to the front edge, the control surface 32 with the control areas 4 and 5. The display 33 and the push-button key 37 with its concave depression 41 located on the front side are arranged in the control area 4. A surface 44 which drops away obliquely with respect to the front edge of the housing 31 and facilitates the guidance of the finger of the operator towards the push-button keys extends along the lower edge of the control surface 32. This surface 44 is designed as an orientation surface with identification zones as already described with respect to FIG. 1. It is thus perfectly possible to provide the push-button keys 36 to 39 with a haptically coded front surface and to arrange in addition an orientation strip with identification zones. In this context, the surfaces of the identification zones should have the same structure as the respective push-button key to which the identification zone is assigned. The angle β of the oblique surface 44 with respect to the control surface 32 is approximately 105° in the exemplary embodiment, but depending on the embodiment of the control unit, this angle may be between 100° and 140°.

Figure 5:
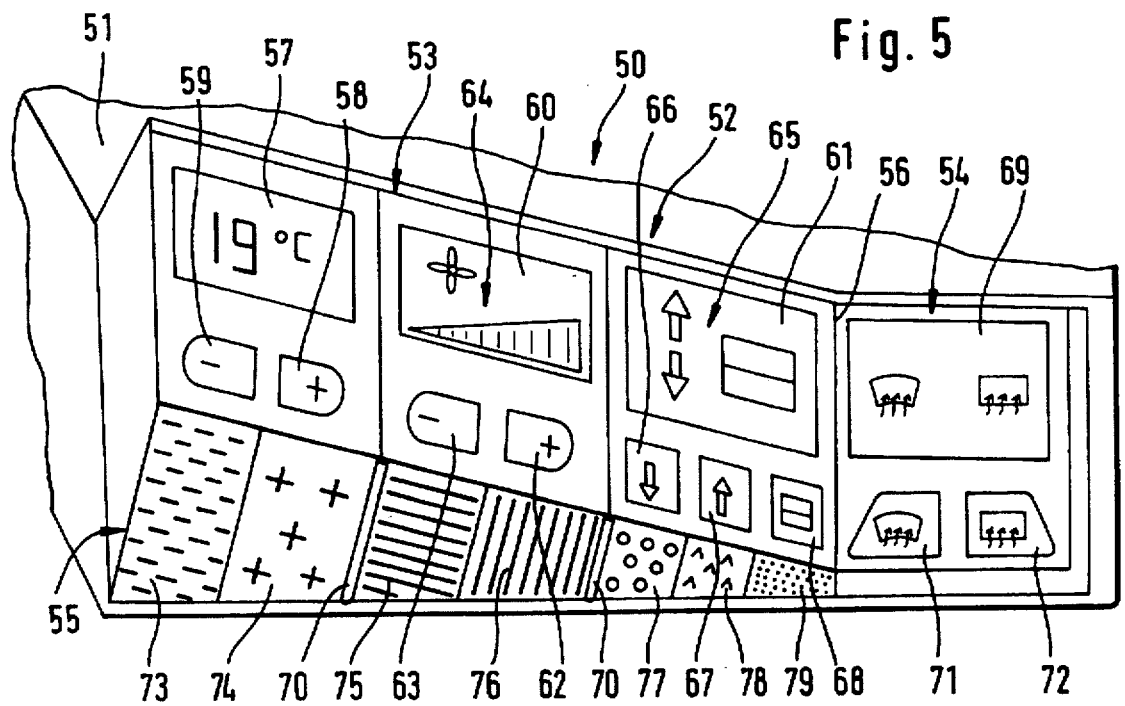
FIG. 5 is a perspective view showing a variant of the embodiment in FIG. 1.

FIG. 5 shows a control unit 50 in which a control surface 52 is formed on the front side of a housing 51. The control surface 52 comprises a control area 53 and a control area 54 which are arranged in two planes running at an angle with respect to one another. A contact line 56 is formed between the control areas 53 and 54. The control area 53 comprises a display 57 for displaying the desired value for the temperature of the passenger compartment of the vehicle. Under the display 57 there are push-button keys 58 and 59 which respectively serve to increase and reduce the desired value.

Arranged next to the display 57 is a further display 60 which contains a display 64 for the currently set blower speed. Underneath the display 60 there are push-button keys 62 and 63 which respectively serve to increase and reduce the blower speed. Furthermore, the control area 53 comprises a display 61 with a display 65 of the air distribution which has been set. Underneath the display 61 there are three push-button keys 66, 67, 68 by means of which the air distribution to footwell nozzles and to upper vents or a preferred basic position of the air distribution of all the vent nozzles can be set. The displays 57, 64, 61 and push-button keys 58, 59, 62, 63, 66, 67, 68 contained in the control area 53 serve to adjust the heating or air conditioning system according to the personal comfort of the driver.

In the control area 54 there is a display 69 with two push-button keys 71 and 72, the push-button key 71 being provided for defrosting the windshield and the push-button key 72 for heating the rear window. The operating state of the respective function is displayed on the display 69. Thus, the control area 54 comprises those push-button keys and displays of the functions relating to driving safety, namely a clear view through the windshield and through the rear window.

An orientation strip 55 with wedge-shaped surface extends along the lower edge of the control area 53, the orientation strip running as far as the contact line 56 of the two control areas 53 and 54. Each of the push-button keys 58, 59, 62, 63 and 66 to 68 is assigned an identification zone 73, 74, 75, 76, 77, 78, 79, these identification zones having a characteristically structured surface by means of which the respective push-button key can be identified haptically. In order to facilitate orientation, groups of identification zones are formed, between which delimitation structures or means are provided. These delimitation structures or means are formed by webs 70 which are slightly elevated and run essentially transversely with respect to the longitudinal direction of the orientation strip 55. By means of these webs 70, the identification zones 73 and 74 are thus combined to form a "temperature adjustment" group, the identification zones 75 and 76 are combined to form a "blower speed adjustment" group and the identification zones 77 to 79 are combined to form an "air distribution" group. The identification zone 73 is provided with relief-like minus signs and the identification zone 74 is provided with relief-like plus signs. The surfaces of the identification zones 75 and 76 are each provided with ribbing, the ribbing of the identification zone 75 running in the longitudinal direction of the orientation strip, and the ribbing of the identification zone 76 running transversely thereto. The identification zones 77, 78 and 79 are provided with different knob patterns; however, identification zones with a different degree of roughness could also be provided.

The orientation strips 15, 55 illustrated in the exemplary embodiments described above may be designed in such a way that a push-button key is arranged in each identification zone. As a result, the finger does not need to be moved from the identification zone to the push-button key, but instead, in order to generate a switching signal, pressure is exerted on the identification zone itself. Furthermore, this saves space for the push-button keys underneath the displays so that the displays themselves can be larger in design, which serves to make them easier to read.

What is claimed is:

1. A control unit suitable for controlling a motor vehicle heating and/or air conditioning system, comprising:

a plurality of control elements located on a control surface and having symbols, respectively assigned to the control elements, for visually displaying the operation of each of the control elements; and an orientation strip arranged on the control surface and adjoining the control elements, the orientation strip comprising identification zones assigned to respective control elements and having respective, differently characterized, haptically coded surfaces.

2. A control unit as claimed in claim 1, wherein the orientation strip extends underneath the respective control elements.

3. A control unit as claimed in claim 2, wherein the orientation strip extends along the lower edge of the control surface.

4. A control unit as claimed in claim 1, further comprising a delimitation structure provided between respective identification zones on said orientation strip.

5. A control unit as claimed in claim 4, wherein the delimitation structures comprise webs which are slightly elevated and run essentially transversely with respect to the longitudinal direction of the orientation strip.

6. A control unit as claimed in claim 1, wherein the haptic coding comprises a characteristic structure selected from roughness, a pattern or a direction of a pattern.

7. A control unit as claimed in claim 1, wherein the haptic coding comprises a significantly different temperature on the surfaces of at least one of the adjacent control elements.

8. A control unit as claimed in claim 7, further comprising a Peltier element provided on the surface in order to generate different temperatures.

9. A control unit as claimed in claim 1, further comprising a display, in which the function assigned to one or more of the control elements being set is displayed.

10. A control unit as claimed in claim 1, further comprising a haptically coded surface on at least one of the control elements.

11. A control unit as claimed in claim 10, wherein at least some of the control elements are constructed as push-button keys with a characteristic front surface.

12. A control unit as claimed in claim 11, wherein two adjacent push-button keys are assigned to the same function with adjustment in opposite directions.

13. A control unit as claimed in claim 12, wherein the front surface of one of said adjacent push-button keys is provided with a concave depression and the front surface of the other adjacent push-button key is provided with a convex bulge.

14. A control unit as claimed in claim 12, wherein the adjacent push-button keys serve as desired-value actuators for adjusting a temperature of the motor vehicle heating and/or air conditioning system, and a digital temperature display being assigned to the adjacent push-button keys.

15. A control unit as claimed in claim 14, wherein two arrays of push-button keys and the digital temperature display are provided for adjusting the temperature, one array serving to adjust the heating and/or air conditioning system for the driver's side, and the other array serving to adjust the heating and/or air conditioning system for the front seat passenger's side.

16. A control unit as claimed in claim 1, wherein the control surface is divided into two control areas, each control area forming essentially one plane and the two planes being arranged at an angle ($\alpha$) with respect to one another.

17. A control unit as claimed in claim 16, wherein a contact line between the two planes runs essentially vertically and the angle ($\alpha$) between the front sides of the planes is approximately 185° to 200°.

18. A control unit as claimed in claim 2, wherein the orientation strip has at least one wedge-shaped cross-section parallel and/or perpendicular to its longitudinal extent.

19. A control unit as claimed in claim 1, wherein the orientation strip and the control surface form between them an angle ($\beta$) of approximately 100° to 140°.

20. A control unit as claimed in claim 11, wherein push-button keys for a rear window heater, a defroster function or a fresh air/circulating air function are provided.

* * * * *